United States Patent [19]

Goulter

[11] Patent Number: 5,012,580
[45] Date of Patent: May 7, 1991

[54] MACADAMIA NUTCRACKER EMPLOYING SLIDING FORCE ARM DRIVEN BY LEVER WITH FIXED END AND FLOATING INTERMEDIATE PIVOTS

[76] Inventor: Victor H. Goulter, 485 Molimo Dr., San Francisco, Calif. 94127

[21] Appl. No.: 475,381

[22] Filed: Feb. 5, 1990

[51] Int. Cl.⁵ .............................................. A47J 43/26
[52] U.S. Cl. ...................................... 30/120.5; 99/572
[58] Field of Search ........................... 30/120.2, 120.5; 99/572, 573, 579, 593

[56] References Cited

U.S. PATENT DOCUMENTS

| | | | |
|---|---|---|---|
| 1,087,617 | 2/1914 | Traber | 99/572 X |
| 1,358,145 | 11/1920 | Glidden | |
| 1,665,557 | 3/1927 | Miller | |
| 1,791,992 | 1/1929 | Wiemers | 146/16 |
| 1,922,515 | 8/1933 | Wood | 146/16 |
| 2,505,538 | 4/1950 | Gehrke | 146/14 |
| 2,563,579 | 8/1951 | Smith | 153/10.5 |
| 2,572,378 | 12/1949 | Paul | 146/16 |
| 2,827,087 | 3/1958 | Connor | 146/16 |
| 3,009,414 | 11/1961 | Griemert | 100/293 |

Primary Examiner—Douglas D. Watts
Attorney, Agent, or Firm—David Pressman

[57] ABSTRACT

A nutcracker for macadamia or other hard nuts (46) comprises an elongated slide bar (21) having an anvil jaw (43) attached to a working end thereof, a parallel elongated arm (35) having a mating jaw (33) attached to a working end thereof, and a hand lever (27) which has a pair of pivots (31B, 41) at one end thereof. The pivots on the hand lever are attached to force-applying ends of the arm (21) and bar (35), respectively, which are opposite to their working ends. The jaw on the bar has a portion (51) which extends around the bar so that the arm is held and will be forced to move only in a direction which is generally parallel to the bar. The anvil jaw on the bar is adjustable in position and is urged to the jaw on the arm by a spring (49). The parts are shaped and the pivots are positioned such that rotation of the hand lever from an open position where it makes a wide angle with the arm and bar to a position where it makes a narrow angle causes the arm to move parallel to the bar with tremendously multiplied force, which actually continually increases as the angle narrows. The device can be post mounted (FIG. 1), portable (FIG. 7), bowl mounted (FIG. 8), or surface mounted.

20 Claims, 5 Drawing Sheets

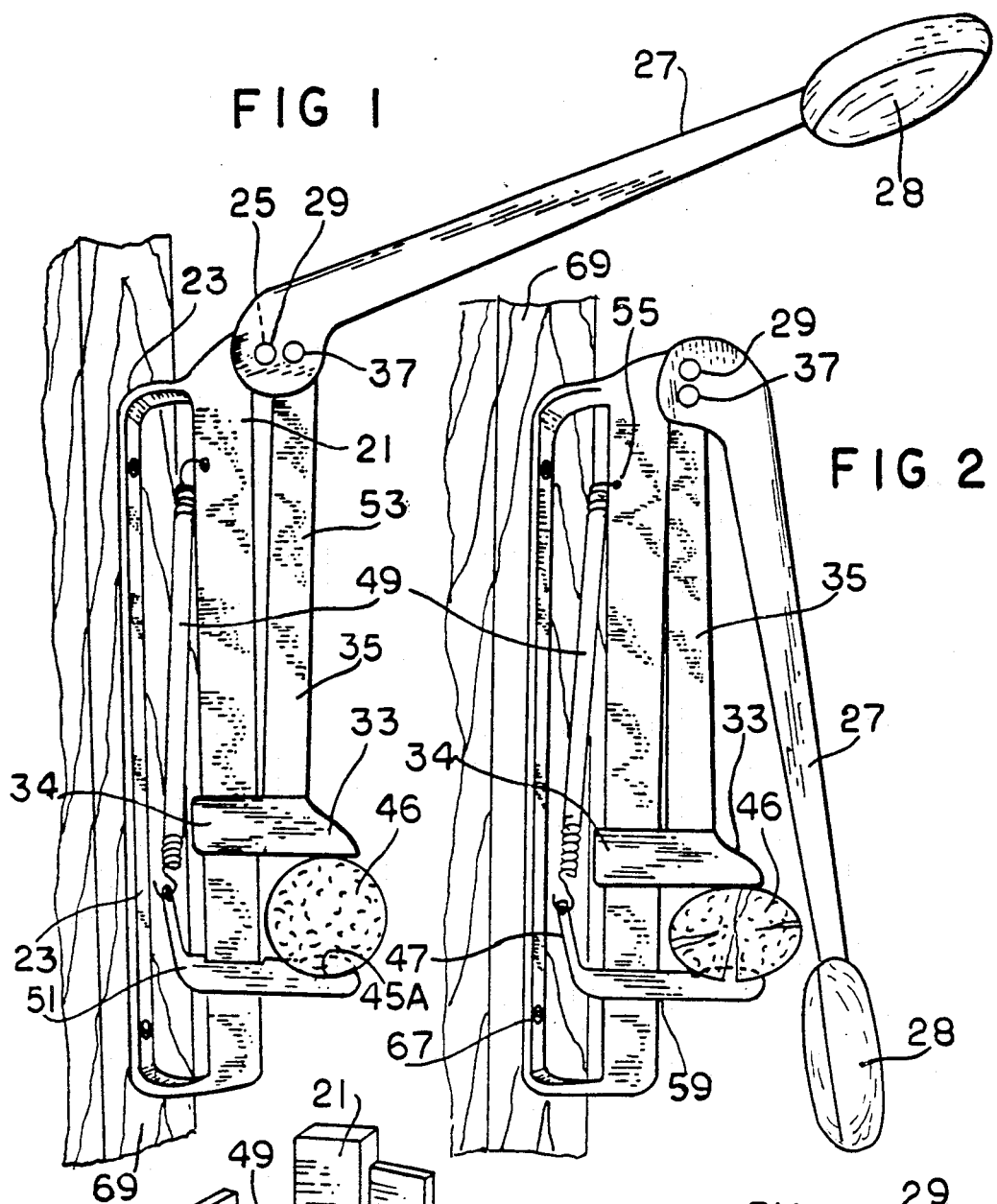
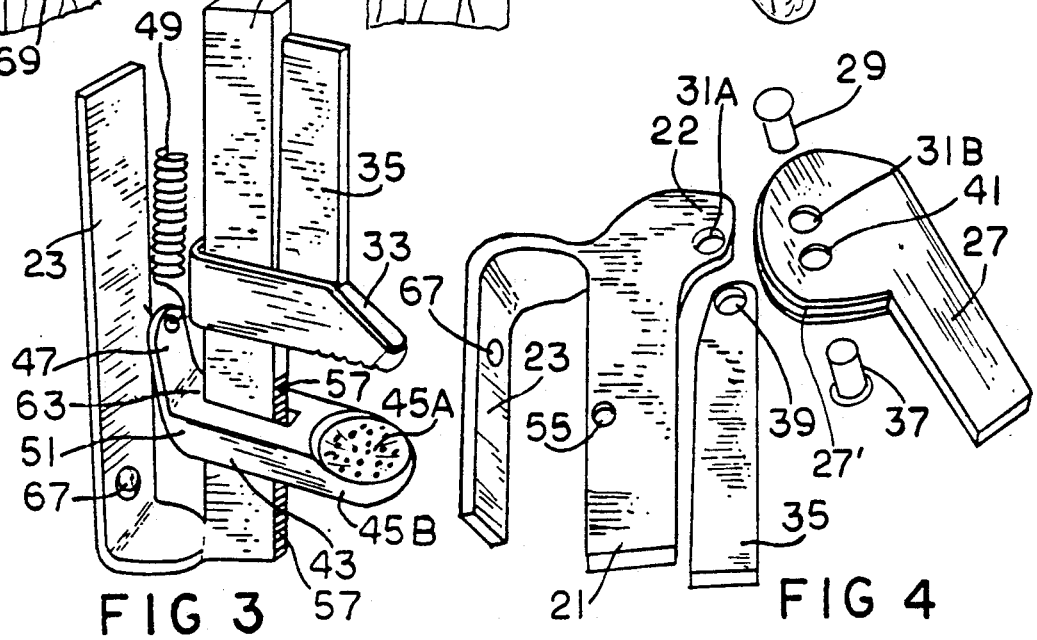

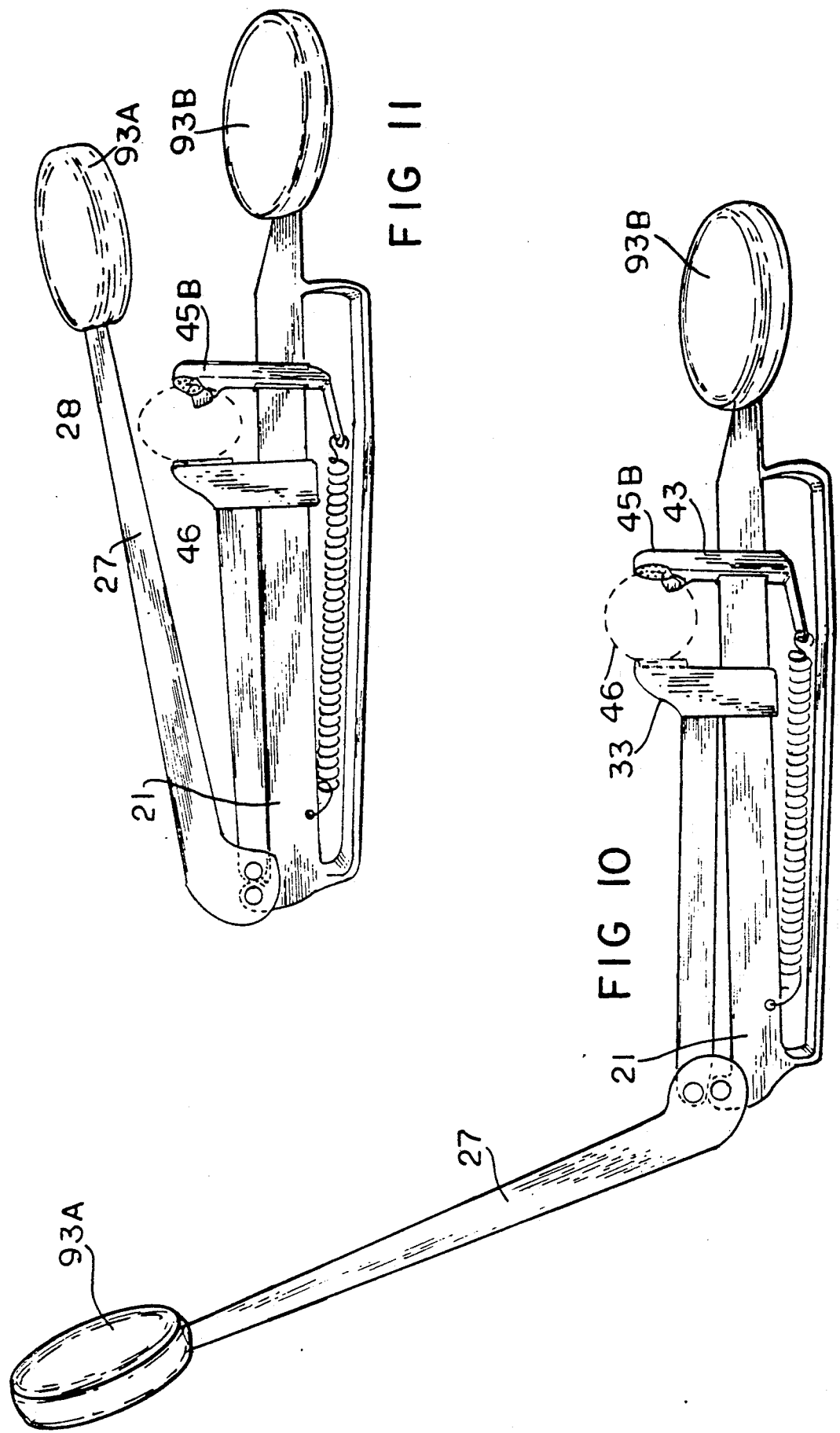

MACADAMIA NUTCRACKER EMPLOYING SLIDING FORCE ARM DRIVEN BY LEVER WITH FIXED END AND FLOATING INTERMEDIATE PIVOTS

BACKGROUND

1. Field of Invention

The present invention relates to nutcrackers, in particular to a nutcracker having a self-locking, hand-adjustable anvil, especially for use with macadamia and other nuts.

2. Description of Prior Art

There are many types of prior-art nutcrackers, none of which are strong enough to crack the tough Australian bush nut, otherwise known as the macadamia nut. None are attractive and all are prosaic.

Macadamia nuts have an extremely tough, yet deformable and elastic shell. In fact they are so tough to crack that they are not usually distributed for sale in the shell, but packed in airtight jars after the shell has been removed at a factory.

Factory shelled nuts, however, are not a suitable alternative compared to the delightful taste of the kernels when freshly removed from the shells: the macadamia is the richest and best flavored of all nuts, but loses a significant amount of flavor over time after it is shelled. However, the consumer is denied this elegant flavor because, insofar as I am aware, no nutcracker is available on the market which will crack these tough nuts.

In Australia, where the native macadamia grows wild, the nuts are broken open by hammer blows. Frequently, injuries occur due to the nut escaping from under the hammer and zipping off at bullet-like speed and striking bystanders, or the person wielding the hammer. Such a practice is dangerous and inconvenient and does little to promote the sale of these health-giving and flavorsome nuts.

Many nutcrackers and force applying devices have been proposed but, as stated, are not suitable for use with the macadamia.

R. L. Glidden in U.S. Pat. No. 1,358,145, dated Nov. 9, 1920, shows a bottle capper which uses a lever with a fixed pivot point and a handle. At a point therebetween is a pivoted pressure capper positioned at ninety degrees to the lever, such that multiplied force can be obtained by applying hand force to the handle. The degree of force applied can easily be calculated by dividing the distance from pivot 25 and pivot 23 into the length of lever 22. This is about 8 to 1. However an 8-to-1 leverage is not nearly enough to crack a macadamia nut, or even a Brazil nut. Also this device has to be post mounted and is not attractive.

J. F. Miller, in U.S. Pat. No. 1,665,557, dated Apr. 10, 1928, teaches a lever type nutcracker which is table mounted. A lever is pivoted at one end to the mounted housing and has an operating handle at the opposite end. The housing also has a fixed anvil 4 against which nuts can be placed. A slide 13 engages the other side of the nut and an actuating arm 14 connects slide 13 to an intermediate pressure pivot point 25 on lever 22, such that by activating the lever, it pushes arm 14, which in turn forces slide 13 to engage a nut against anvil 4.

One of the problems with this device is that it must be specifically adjusted for each different nut sizes. This is accomplished by providing different notches. However, this will not work for macadamia nuts because their shells have excellent elastic properties and distort under pressure to a large degree before cracking occurs. This could result in having to make two calculated adjustment positions to accomodate the very resistant and elastic property of the shell of the macadamia nut. Also this device has to be table mounted, and is complex in design and is unnatractive in appearance.

J. Weimer, in U.S. Pat. No. 1,791,992, dated Jan. 12, 1931, teaches a hand-held nutcracker which has a fixed anvil 3 attached to one handle 4 against which a nut can be placed. Handle 4 also incorporates a slide section 2 on which a slide member 10 cooperates and which carries a moving jaw 7 and a toothed rachet 9. A second handle 16 is pivoted to a carrier and carries a pawl 20, such that when handle 16 is closed, pawl 20 urges jaw 7 toward jaw 3 to crack a nut placed therebetween.

There are a number of deficiencies with this nutcracker. First, one hand is required to hold the nut in place, while the other hand positions slide jaw 7 against the nut to hold it in position. Then a hand has to be moved to the handles to close them so as to crack the nut. If the nut simply distorts, but doesn't crack, as a macadamia nut will do, then the handle has to be opened to engage a new ratchet grip, and a second try made to crack the nut. Another problem is that a child cannot be expected to use it, because a child's hand cannot open wide enough to grasp the handles, nor exert enough force to close the jaws against a macadamia nut, or any other hard-to-break nut.

F. W. Woods, in U.S. Pat. No. 1,922,515, dated Aug. 15, 1933, shows a nutcracker which has to be screwed to a table or post. Therefore it cannot be passed from person to person. Also it requires a number of highly machined parts. In operation lug 20, which has a rounded surface, comes into contact with the flat end of stem 7. This takes place when the pressure between them is excessive, i.e., enough to crack a nut. At the same time, since lug 20 is moving in an arc, and stem 7 is moving axially, there is a sliding action taking place, between these two parts which will cause excessive wear. Furthermore the device is not attractive.

M. Paul, in U.S. Pat. No. 2,572,378, dated Oct. 23, 1951, shows a nutcracker and ice crusher which is similiar to device in the Glidden patent, supra. It has a leverage of about eight-to-one, which is not nearly sufficient to crack a macadamia nut.

H. H. Smith, in U.S. Pat. No. 2,563,379, dated Aug. 7, 1951, shows a can crusher. This device is similiar to those of M. Paul and Glidden patents, supra, and likewise has insufficient leverage to crack macadamia nuts.

T. B. Conner, in U.S. Pat. No. 2,827,087, dated Mar. 18, 1958, shows a reciprocrating nutcracker which has the same problems as the devices of Smith, Paul, and Glidden. Also it must be table mounted.

L. R. Gehrke, in U.S. Pat. No. 2,505,538, dated Apr. 25, 1950, shows a nutcracker which is similiar to that of Glidden and has the same ineffective leverage.

K. H. Griemert, in U.S. Pat. No. 3,009,414, dated Nov. 21, 1961, shows a can crusher which uses a simple lever and has insufficient leverage to crack macadamia nuts.

Objects and Advantages

Accordingly, one object and advantage of the present invention is to provide a nutcracker which will provide sufficient force to easily crack a macadamia nut, even when used by young children. Additional objects and advantages are to provide a nutcracker which can be mounted on a post, on a flat surface, such as a tabletop, in a bowl, on a lightweight movable base, or fitted with two handles so that it can be handled rather than mounted. Another object and advantage is to provide a nutcracker which can be used easily by young children and grown adults alike. Still further objects and advantages are to provide a nutcracker which has a hand-slidable, self-locking anvil for accomodating any size nut and in which the force applied by the lever to the nut increases as the resistance of the nut increases. A further object and advantage is to provide a nutcracker in which the crusher jaw has a designated travel, enough to break the shell, but not the kernel. Still further objects and advantages are to provide a unit which is easily manufactured, inexpensive to produce, attractive in appearance, which can be passed from person to person easily, and which will accept and crack the shells of macadamia and any other nut with ease. Another object is to provide a nutcracker which can be used to crack multiple nuts in rapid succession. Still another object and advantage is to provide a nutcracker which is very attractive and can be decorated with many varieties and types of plain or ornamental designs of bowls, bases, or supports.

Further objects and advantages will become apparent from a consideration of the ensuing description, taken in conjunction with the accompanying drawings.

BRIEF DESCRIPTION OF DRAWINGS

FIG. 1 is a perspective view of the nutcracker of the present invention mounted vertically on a post with its lever raised.

FIG. 2 is a perspective view of the nutcracker of FIG. 1, with the lever down.

FIG. 3 is a perspective view showing locking grooves and an adjustable anvil used in the nutcracker.

FIG. 4 is a perspective exploded view of a hand lever and pressure bar pivots of the nutcracker.

FIG. 10 is a perspective view of the nutcracker fitted with two "cake-of-soap" type handles in the open position.

FIG. 11 is a perspective view of the nutcracker of FIG. 10 with the handles in the closed position.

Figure 5:
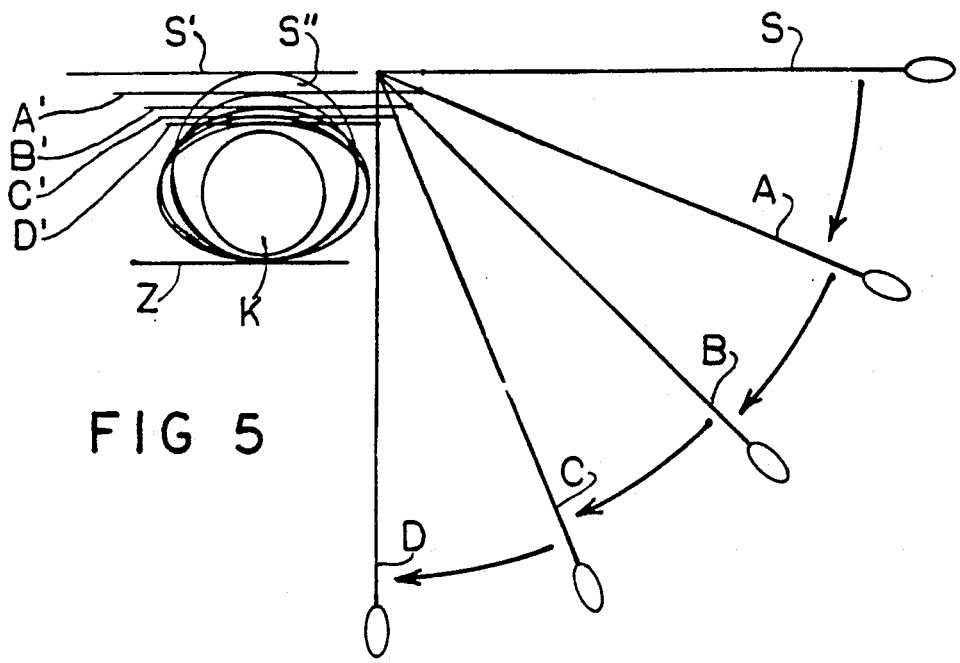
FIG. 5 is a diagrammatic view of the hand lever, and crusher jaw positions during the crushing of a macadamia nut.

REFERENCE NUMERALS 21 slide bar
22 projection
23 mounting base
25 pivot point
27 hand lever
27' slot
28 handle
29 pivot pin
31a and 31b hole
33 crushing jaw
34 loop portion
35 extension arm
37 pin
39 hole
41 hole
43 anvil member
45A roughed concave seat
45B jaw
46 nut
47 tongue
48 Brazil nut
49 cord or spring
51 side
53 other end
55 hole
57 notches or grooves
59 integral paul
61 space
63 fulcrum point
65 side
67 screw holes
69 post
71 portable base
73 base recess
75 base recess
77 cover
79 flexible cover
81 rivet
83 bowl
87 pistol grip handle
89 side attachments
91 insert
93A and 93B cake-of-soap type handles

DETAILED DESCRIPTION OF THE PREFERRED EMBODIMENT—FIGS. 1 AND 2

FIG. 1 shows a perspective view of a nutcracker in accordance with my invention mounted vertically on a post. The nutcracker comprises a slide bar 21, a mounting base 23, a hand lever 27 and handle 28, an extension arm 35 with crusher jaw 33, and a movable anvil 43. Slide bar 21 has an integral, parallel, spaced mounting base or arm 23 which is attached to post 69 (wood or the like) by any convenient means, such as screws, riveting, bolting, etc. Slide bar 21 comprises an elongated bar with a rectangular cross section. It has a pivot point 25 at its upper end (best seen in FIG. 4) on which pivots a hand lever 27 on a pivot pin 29 in holes 31A (in bar 21) and 31B (in lever 27). The upper end of bar 21 has a protruding ear or projection 22 (FIG. 4) in which hole 31A is formed. Base 23 is also rectangular in cross section and is spaced from bar 21 by about 2 cm (0.75 in).

Slide bar 21 carries a crushing jaw 33 and an integral extension arm 35, which is hinged by a pin 37 (FIG. 4) through a second hole 39 in extension arm 35, and a hole 41 in hand operating lever 27. Jaw 33 has a loop portion 34 which extends around and is slidably movable on bar 21.

Figure 6A:
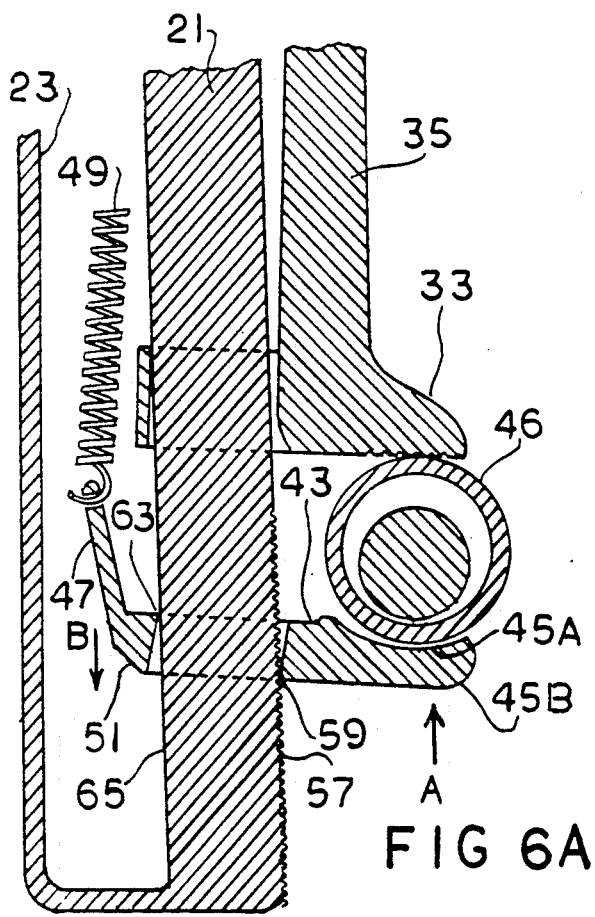
FIG. 6A is a sectional view of the jaws of the nutcracker and a macadamia nut.

Slide bar 21 also carries hand-positionable anvil member 43 and jaw 45B which has a roughened concave seat 45A for seating nuts 46 thereon (FIGS. 1 and 6A). Anvil member also incorporates a tongue 47 to which a spring or rubber cord 49 is attached and which constantly urges side 51 of anvil member 43 toward crushing jaw 33 The other end 53 of spring 49 is attached to hole 55 in bar 21 (FIGS. 1 and 2).

Figure 6B:
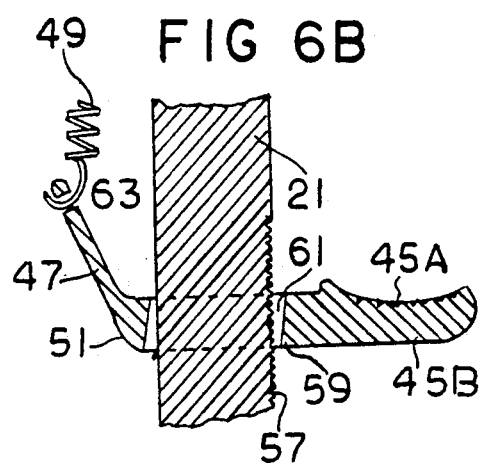
FIG. 6B is a sectional view of the anvil member being raised.

The bottom 50 mm (2 in approximately) of bar 21 (FIG. 3) contains transverse grooves which form a series of notches or ratchet grooves 57 (FIG. 3 and 6A). These are engaged by an integral pawl 59 (FIG. 6) of anvil member 43 when pressure is applied to jaw 45 during the nut cracking process. Anvil member 43 also incorporates a fulcrum point 63 (FIG. 6A) which bears against side 65 of slide bar 21. The pull of tension spring 49 on tongue 47 causes pawl 59 to engage rachet grooves 57 and lock in position. Hand lever 27 is about 225 mm (8.81 in) long and has a "cake-of-soap handle 28 at its outer end.

Arm 35 also comprises an elongated bar with a rectangular cross section. One end of arm 35 is attached to jaw 33 as stated.

Its other end contains a hole 39 (FIG. 4) which is attached to hole 41 in the proximal end of hand lever 27 by pin 37.

Hand lever 27 has two holes, 31B and 41 in its widened proximal end, which has a slot 27' to accomodate arm 35 and bar 21. Hole 31B, which is coaxial with hole 31A in arm 21, is closer to the proximal end of hand lever 27 than hole 41, which aligns and is coaxial with and pivoted to hole 39 of arm 35.

Slot 27' has sufficient width to embrace the end of extension arm 35 and projection 22 of bar 21. When assembled, pins 29 and 37 pass through both sides of slot 27' and can be swaged to prevent them from coming out.

Methods of Mounting Nutcracker—FIGS. 1,4,7 and 10)

As stated, an integral mounting base 23 (FIGS. 1 and 4) is attached to the upper and lower ends of bar 21 and provided with screw holes 67 so that one can mount the nutcracker to vertical post 69 (FIGS. 1 and 2). Also base 23 can be affixed to a lightweight portable base 71 (FIG. 7), to a heavier bowl 83 (FIG. 8), or even permanently to a horizontal surface (not shown).

Operation

Assuming the nutcracker is mounted on a vertical post (FIG. 1), the user first raises hand lever 27 as high as it will go, thus lifting arm 35 and jaw 33 to the limit of their upward travel as shown. This movement is about 8 mm (0.28 in). Nut 46 is placed in concave seat 45A on jaw 45B (FIGS. 1 and 6A), which can be lifted upward in the direction of arrow A until the nut comes in contact with jaw 33. Spring 49 now maintains upward pressure, thus holding nut 46 against jaw 33.

To crack the nut, hand lever 27 is now pulled downward as far as it will go, which is about ninety degrees of rotational travel. During movement of lever 27, jaw 33 will exert downward pressure against nut 46 which will, in turn, exert downward pressure on jaw 45, causing pawl 59 to engage one of grooves 57 in slide bar 21 and lock it from further movement. Then jaw 33 will distort the shell of the nut by its distance of travel, about 8 mm. This is sufficient to crack the shell open, without damaging its kernel. This also applies to Brazil nuts when they are placed endwise between the jaws, as shown at 48 in FIG. 7.

During about the first 20 to 25 degrees of movement of lever 27, it has a leverage of about 32-to-1 with respect to jaw 33. This is sufficient to begIn distorting the elastic shell of the macadamia nut, which has minimal resistance at this early stage. This leverage is based on the below-indicated length of lever 27, but can be increased by lengthening lever 27. However, when lever 27 is moved further down (about 20 to 25 degrees more), the leverage over jaw 33 increases to about 40 to 1. Continued movement of lever 27 (20 to 25 degrees more) increases the leverage to 70 to 1. During the final quarter of movement (20 to 25 degrees more) the leverage increases to 140 to 1.

As lever 27 is pulled down, the resistance of the shell of the macadamia nut will increase until it finally breaks after aproximately 8 mm (0.27 in) of distortion. If any nut does not break with the first full pull-down of lever 27 the problem is easily overcome by lifting the lever half-way up again, while at the same time urging anvil member upward in the direction of arrow A (FIG. 6A) then pulling the lever down again.

The hand lever movement in relation to nut distortion is further expressed in the diagrammatic drawing FIG. 5.

In FIG. 5 line Z represents the locked position of anvil member 43.

Circle S" represents a macadamia nut placed between jaws 33 and 45B (FIGS. 1 and 6A).

Line S represents lever 27 in the raised position, while line S' represents jaw 33 in its raised position.

Line A represents hand lever having been moved downward one quarter of its downward travel, while line A' represents the distance travelled by jaw 33 during this first quarter travel of lever 27. Circle S" now shows distortion.

Line B represents lever 27 moved a second quarter of downward travel, while line B' represents the distance travelled by jaw 33 during the second quarter and shows more nut distortion.

Line C represents lever 27 having been moved a third quarter of downward travel, while line C' represents the distance travelled by jaw 33 during this travel, and also shows still more nut distortion under line C'.

Finally line D represents the fourth quarter of downward travel of lever 27, while line D' represents the distance jaw 33 moved in the last quarter This is very minute compared to the distance jaw 33 moved in the first quarter. This final distortion is sufficient to crack the most resistant macadamia nut.

Circle K represents the unbroken kernel.

Note that during the cracking process the very tough and elastic macadamia nut shell is offering progressively greater resistance to breaking as it is progressively distorted by jaw 33. Also, although lever 27 is moved downward the same distance in each quarter, jaw 33 moves progressively less, therefore the leverage becomes progressively greater.

When jaw 45 of anvil 43 is pushed upward by hand in the direction of arrow A, it changes the general angle that the anvil member makes with slide bar 21, thus creating a space 61 (FIG. 6B) between pawl 59 and grooves 57. This space enables the anvil to move freely. To move the anvil in the opposite direction, one pushes on its opposite (top) side in the direction of arrow B (FIG. 6A) thus stretching spring 49.

Also note that hand lever 27 is attached to bar 21 by a fixed pivot 25. Thus lever 27 and handle 28 always moves in a fixed arc with respect to pivot 25. However pivot 37 "floats", i.e., its position changes and actually moves in its own small arc as lever 27 is pulled down. The upper end of arm 35 also moves in this arc concurrently. The end of this arc is closer to or on an imaginary line connecting the lower end of arm 35 with pivot 25, than the beginning of this arc, which is spaced from this line. It is the forced movement of the upper end of arm 35 along this arc which creates the aforementioned increasingly multiplied force. Also note that, despite the movement of the upper end of arm 35 in an arc, its lower end, including jaw 32, is constrained to move linearly by loop portion 34. When lever 27 is rotated fully down (FIG. 2), note that fixed pivot 29, floating pivot 37, and arm 35 are substantially in line or coaxial.

Part Dimensions

The distance between hole 31B and hole 41 must be 7 mm in order to be able to move crusher jaw 8 mm down during a quarter of a circle movement of hand lever 27. The hand lever must be 32 times this length to have a 32-to-1 leverage at the beginning of lever movement. The dimensions of lever 27 are 224 mm (8.81 in) long, 3 to 4 mm thick, and tapers from 12 mm (0.5 in) to 9 mm (0.375 in) at the handle end. However due to normal slack, lever 27 moves some 10-to-20 degrees of rotation at the beginning of its downward movement before significant real pressure begins on the nut. For this reason lever 27 can be reduced in length to aproximately 220 mm (8.6 in). Handle 28 is about 20 mm (0.75 in) thick, 50 mm (2 in) wide and can be round or oval (like an cake-of-soap) in shape. Slide bar 21 is about 215 mm (8.5 in) long, 19 mm (0.75 in) wide, and 6.5 mm (0.25 in) thick and other parts are to scale.

Figure 7:
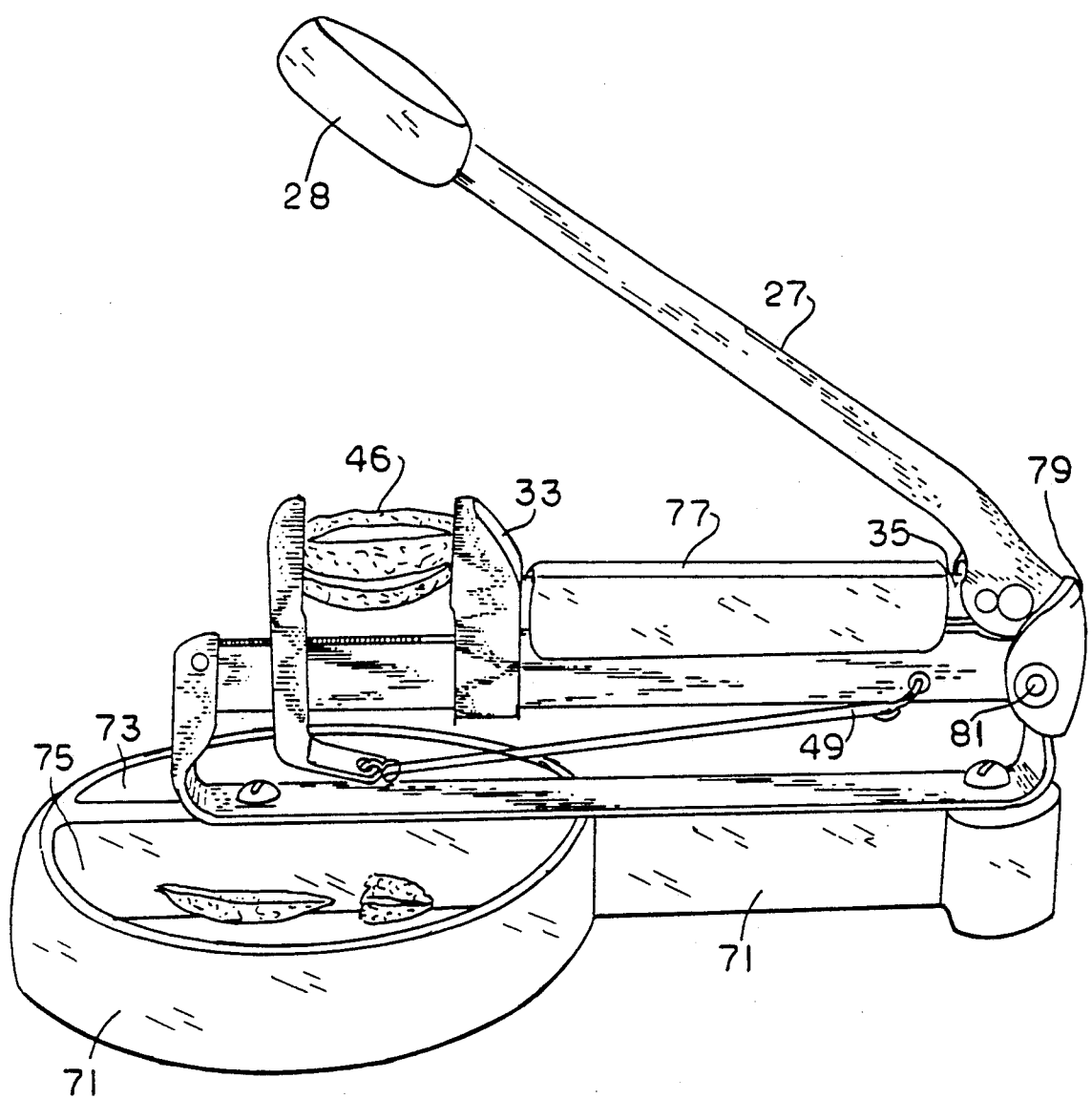
FIG. 7 is a perspective view of the nutcracker mounted on a base.

Portable Base Mounting—FIG. 7

FIG. 7 shows the nutcracker mounted on a portable base 71. The advantages of this type of mounting are that it can be passed between persons who are sitting, and it can be taken along while touring, or on outings, picnics, etc.

Two recesses 73 and 75 provide receptacles for broken shell pieces, which can be emptied peroidically.

A plastic cover 77 is fitted tightly over extension arm 35 and loosely over slide bar 21 to prevent a user from holding the unit at that point while operating hand lever 27. This eliminates any chance of having one's fingers pinched between extension arm 35 and slide bar 21. A flexible cover 79 of rubber or like material can be secured by rivet 81 and fitted to prevent a user, or another person from placing a hand where there is a slight chance of having the skin of their finger pinched by the mechanism. All the embodiments shown should be fitted with this protection.

Figure 8:
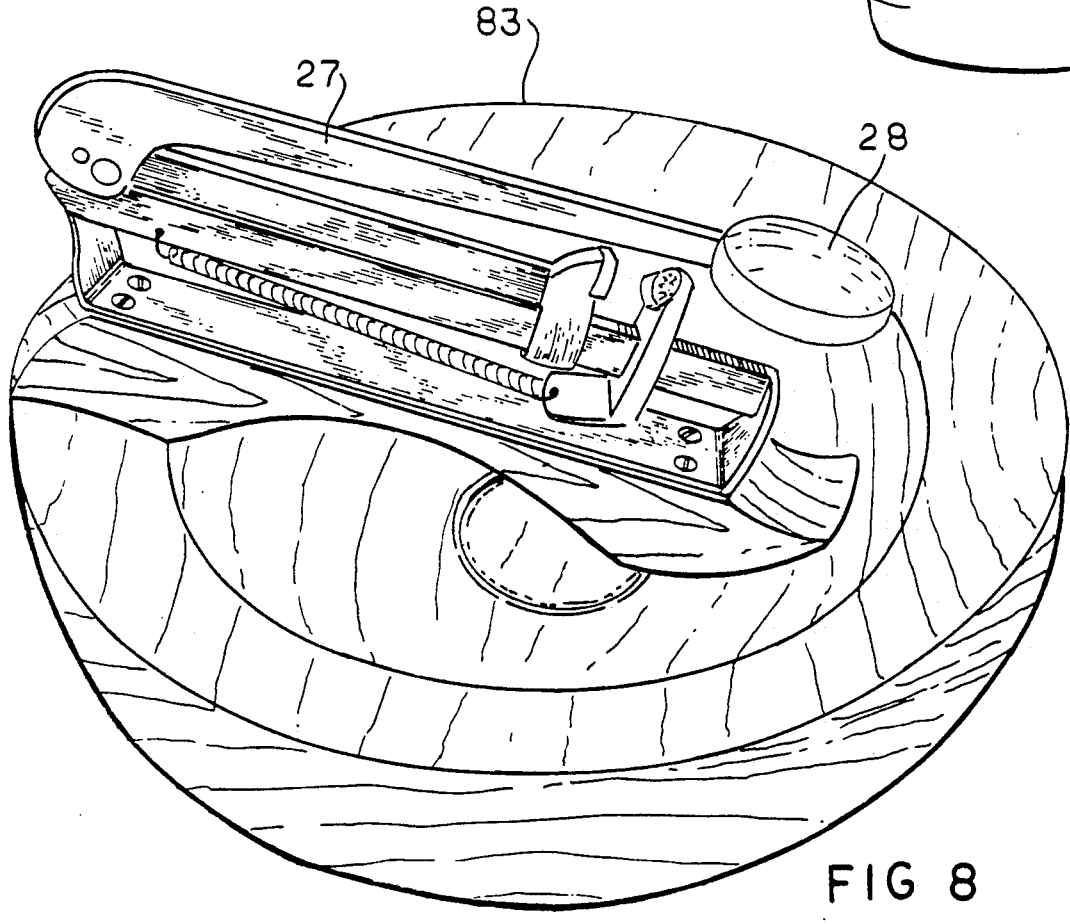
FIG. 8 is a perspective view of the nutcracker mounted on a bowl.

Bowl Mounting—FIG. 8

The nutcracker can be mounted in a bowl 83 as shown in FIG. 8. This has a number of advantages, one being that the unit is more stable. Another is that the bowl will catch falling pieces of the nut. Also it will hold a considerable amount of nut residue.

Figure 9:
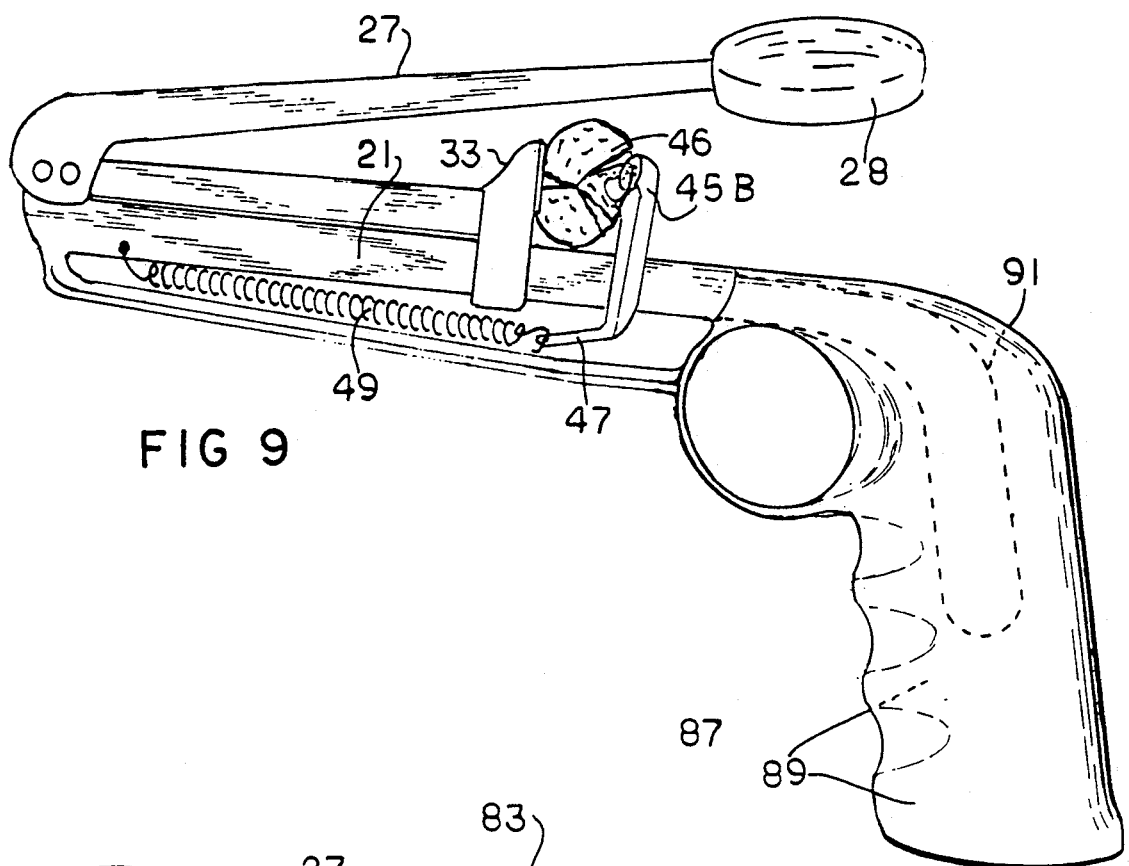
FIG. 9 is a perspective view of the nutcracker fitted with one pistol- grip handle, and one "cake-of-soap" type handle.

Pistol Grip Handle—FIG. 9

The pistol grip handle mounting shown in FIG. 9 is considered a novelty application and is less stable than the lightweight base mounting shown in FIG. 7. Pistol grip handle 87 can be made of any suitable material, such as wood or plastic. Side attachments 89 are riveted to a metal blade insert 91. This insert is the extension of slide bar 21 and is made integral with it.

Cracker with Cake-of-Soap Type Handles—FIGS. 10 and 11

Cake-of-soap-type handles 93A and 93B reduce the overall size of the unit and facilate packaging and easier carrying in luggage. These handles can be injection molded from plastic and fitted to extensions of hand lever 27 and slide bar 21.

Materials

Slide bar 21 preferably is made of medium carbon steel and is aproximately 6.5 mm (0.25 in) thick by 16 mm (0.625 in) wide. This thickness is recommended to withstand the forces generated by the mechanism of the cracker when applied to a macadamia nut to crack its shell. Other materials can be preferably of steel, or any other suitable material. Spring 49 (FIGS. 1,2 and 6A) can be replaced with a light bungee cord.

Summary, Ramifications and Scope

Thus the reader will see that I have provided a nutcracker that can not only crack the toughest macadamia nuts, but all other difficult-to-crack nuts. Also it can be used by children and adults alike. It can be mounted in many ways to suit individual users, or it can simply be fitted with handles for the convenience of packing, carrying, or being less costly. It can also be made of readily available materials, and with normal industrial proceedures.

While the above description contains many specificities, the reader should not construe these limitations on the scope of the invention but merely as exemplifications of preferred embodiments thereof. Those skilled in the art will envision that many other possible variations are within its scope. For example skilled artisans will reasily be able to change the dimensions and shapes of the various embodiments, such as by making the parts longer, bigger, smaller, more robust, with different type handles, jaw shapes, mounting bases, etc. Also there are numerous automatic locking methods which can be used to lock the anvil member to the slide bar when pressure is applied to jaw 45. One such method consists of tapering the two edges of slide bar 21, and grooving mating surfaces within the slot of anvil member 43. Another is to provide multiple thin plates, each having a hole slightly larger than the dimensions of this slide bar, such that each plate will slip on the slide bar, but when not kept exactly square it will lock. Such locking methods are used on some adjustable clamps on today's market. The anvil can be fixed rather than movable (for nuts or workpieces of fixed sizes). In lieu of hand lever a large wheel can be substituted; its center would be pivoted at pivot 25, pivot 37 would be attached to a spoke or radial disc near the center, and its rim would be spaced out at the distance of handle 28. In addition to cracking edible nuts, my cracker can also be used for squeezing juice from garlic cloves or other produce, fitting snaps to clothing, spreading hollow point rivets, or anywhere tremendous; yet controllable compression force is required.

Accordingly, the reader is requested to determine the scope of the invention by the appended claims and their legal equivalents, and not by the examples which have been given.

I claim:

1. A device for converting rotary movement to linear movement with multiplied force which increases in proportion to the amount of rotary movement, comprising:

an elongated arm having first and second ends;
an elongated bar also having first and second ends,
an elongated lever also having first and second ends,
means for constraining said second end of said arm to move in a substantially linear manner with respect, parallel, and adjacent to said elongated bar,
said first end of said elongated lever being pivotally attached to said first end of said bar by a fixed pivot,
said first end of said elongated arm being pivotally attached to said first end of said lever by a floating pivot,
said floating pivot being located on said lever at a location closer to said second end of said lever than said fixed pivot is located,
said fixed and floating pivots also being located such that when said lever is rotated on said fixed pivot toward said bar, said floating pivot will move in an arc toward said bar and said fixed and floating pivots and said arm will be substantially coaxial at one position of said lever with respect to said bar.

2. The device of claim 1 wherein said fixed and floating pivots are not coaxial with the direction of elongation of said lever.

3. The device of claim 1 wherein said means for constraining comprises a loop attached to one of said arm and said bar and extending around the other of said arm and said bar.

4. The device of claim 1 wherein said second end of said arm and said bar have a pair of mating jaws, respectively.

5. A device for manually applying a high, yet easily controllable compression force with very high leverage, comprising:

an elongated anvil-holding slide bar, said slide bar having working and pivot ends,
an elongated force-applying arm positioned adjacent and generally parallel to said slide bar, said arm having force-applying and working ends,
means for constraining said force-applying end of said arm to move substantially parallel and adjacent to said slide bar,
an elongated hand lever having a pivot end and a grasping end,
said working end of said arm having a compression jaw attached thereto,
an anvil positioned adjacent to said working end of said slide bar, a portion of said anvil facing a portion of said jaw such that when a workpiece is placed between said anvil and said jaw, said jaw, with said attached arm, can be moved toward said anvil so as to compress said workpiece between said anvil and said jaw,
said pivot end of said hand lever having fixed and floating pivots, said fixed pivot being closer to said pivot end of said hand lever than said floating pivot, said fixed pivot being pivotably attached to said force-applying end of said slide bar, said floating pivot being pivotably attached to said force-applying end of said arm,
said fixed and floating pivots, said arm, said hand lever, and said slide bar being shaped and spaced such that (a) when said hand lever is rotated about said fixed pivot from a position making a relatively wide angle with said slide bar to a closer angle with said slide bar, said hand lever will force said working end of said arm to move in a generally parallel manner to said slide bar so as to move said jaw closer to said anvil with multiplied force, and (b) when said lever is so rotated on said fixed pivot toward said slide bar, said floating pivot will move in an arc toward said slide bar and said fixed and floating pivots and said arm will be substantially coaxial when said lever is at a relatively close angle to said slide bar.

6. The device of claim 5 wherein said anvil includes means for enabling it to be slidably movable along said slide bar.

7. The device of claim 6, further including means for locking said anvil along said bar in any of a plurality of positions.

8. The device of claim 7 wherein said means for locking said anvil along said bar in any of a plurality of positions comprises a series of ratchet teeth on said bar and a pawl on said anvil.

9. The device of claim 6, further including means for continuously urging said anvil to said force-applying end of said bar.

10. The device of claim 5 wherein said means for constraining comprises a portion of said anvil which extends around said slide bar.

11. The device of claim 5 wherein said force-applying end of said slide bar includes a projecting portion which extends out from said slide bar and which contains a pivot hole.

12. The device of claim 5 wherein said hand lever includes a projecting portion which extends out from said hand lever and which contains holes for said fixed and floating pivots.

13. The device of claim 5, further including means for attaching said device to a base support member.

14. The device of claim 13, further including a hand grip, said device being attached to said hand grip.

15. The device of claim 13 wherein said means for attaching comprises an elongated mounting base member which is attached to said bar in a parallel, spaced relation to said bar.

16. The device of claim 5 wherein said pivot end of said hand lever has a slot therein, said force-applying ends of said bar and said arm being pivotably positioned in said slot.

17. A device for manually applying a high, yet easily controllable compression force with very high leverage, comprising:

an elongated anvil-holding slide bar, said slide bar having working and pivot ends,
an elongated force-applying arm positioned adjacent and generally parallel to said slide bar, said arm having force-applying and working ends,
an elongated hand lever having a pivot end and a grasping end,
said working end of said arm having a compression jaw attached thereto,
said working end of said slide bar having an anvil slidably attached thereto, a portion of said anvil facing a portion of said jaw such that when a workpiece is placed between said anvil and said jaw, and said jaw, with said attached arm, is moved toward said anvil, said workpiece when said workpiece will be compressed between said anvil and said jaw, said pivot end of said hand lever having a projecting portion which extends out from the rest of said hand lever, said projecting portion having fixed and floating adjacent pivot holes, said fixed pivot hole being closer to said pivot end of said hand lever than said floating pivot hole, said fixed pivot hole being pivotably attached to said force-applying end of said slide bar by a pivot pin, said floating pivot hole being pivotably attached to said force-applying end of said arm by another pivot pin, said pivots, said arm, said hand lever, and said slide bar being shaped and spaced such that:
 (a) when said hand lever is rotated about said fixed pivot from a position making a relatively wide angle with said slide bar to a closer angle with said slide bar, said hand lever will force said working end of said arm to move in a generally parallel manner to said slide bar so as to move said jaw closer to said anvil with multiplied force, and
 (b) when said lever is so rotated about said fixed pivot toward said slide bar, said floating pivot will move in an arc toward said slide bar and said fixed and floating pivots and said arm will be substantially coaxial when said lever is at a relatively close angle to said slide bar.

18. The device of claim 17, further including means for locking said anvil along said bar in any of a plurality of positions.

19. The device of claim 17, further including means for continuously urging said anvil to said force-applying end of said bar.

20. The device of claim 17, further including means for locating said anvil along said bar in any of a plurality of positions and means for continuously urging said anvil to said force-applying end of said bar.

* * * * *